(12) United States Patent
Kimmel et al.

(10) Patent No.: US 8,908,958 B2
(45) Date of Patent: Dec. 9, 2014

(54) DEVICES AND METHODS OF GENERATING THREE DIMENSIONAL (3D) COLORED MODELS

(76) Inventors: Ron Kimmel, Haifa (IL); Yaron Honen, Moshav Rakefet-Doar-Na Galil Tachton (IL)

(*) Notice: Subject to any disclaimer, the term of this patent is extended or adjusted under 35 U.S.C. 154(b) by 729 days.

(21) Appl. No.: 12/874,326

(22) Filed: Sep. 2, 2010

(65) Prior Publication Data

US 2011/0050859 A1 Mar. 3, 2011

Related U.S. Application Data

(60) Provisional application No. 61/239,448, filed on Sep. 3, 2009.

(51) Int. Cl.
*G06K 9/00* (2006.01)
*H04N 13/02* (2006.01)
*G01B 11/25* (2006.01)
*G06T 7/00* (2006.01)

(52) U.S. Cl.
CPC ....... *H04N 13/0257* (2013.01); *H04N 13/0253* (2013.01); *G06T 2207/10024* (2013.01); *G06T 2207/10016* (2013.01); *G01B 11/2509* (2013.01); *G06T 7/0057* (2013.01); *G06T 2200/08* (2013.01)
USPC ............... 382/154; 348/50; 348/51; 382/106; 382/131

(58) Field of Classification Search
CPC .................................................... G01B 11/2509
USPC ........................................................... 348/50
See application file for complete search history.

(56) References Cited

U.S. PATENT DOCUMENTS

| | | | | |
|---|---|---|---|---|
| 6,061,083 A | * | 5/2000 | Aritake et al. | 348/51 |
| 6,229,562 B1 | * | 5/2001 | Kremen | 348/51 |
| 6,438,260 B1 | * | 8/2002 | Robinson | 382/131 |
| 6,556,706 B1 | * | 4/2003 | Geng | 382/154 |
| 6,754,370 B1 | * | 6/2004 | Hall-Holt et al. | 382/106 |
| 6,965,690 B2 | * | 11/2005 | Matsumoto | 382/154 |
| 7,027,081 B2 | * | 4/2006 | Kremen | 348/51 |
| 7,092,563 B2 | * | 8/2006 | Shiratani | 382/154 |
| 7,684,614 B2 | * | 3/2010 | Kim et al. | 382/154 |
| 7,929,751 B2 | * | 4/2011 | Zhang et al. | 382/154 |
| 8,107,723 B2 | * | 1/2012 | Venkatesan et al. | 382/154 |
| 8,224,064 B1 | * | 7/2012 | Hassebrook et al. | 382/154 |
| 8,483,477 B2 | * | 7/2013 | Lemonde et al. | 382/154 |
| 2005/0254726 A1 | * | 11/2005 | Fuchs et al. | 382/285 |
| 2006/0210146 A1 | * | 9/2006 | Gu | 382/154 |
| 2007/0058088 A1 | * | 3/2007 | Schubert et al. | 348/743 |
| 2009/0238449 A1 | * | 9/2009 | Zhang et al. | 382/165 |

* cited by examiner

*Primary Examiner* — William C Vaughn, Jr.
*Assistant Examiner* — Luis M Perez
(74) *Attorney, Agent, or Firm* — Trop, Pruner & Hu, P.C.

(57) ABSTRACT

A method of forming at least one three dimensional (3D) color image of at least one object in a target space. The method comprises projecting, each of a plurality of projection cycles, a sequence comprising a plurality of gray coded light patterns, each colored in one of red green or blue, on a target space, capturing a plurality of two dimensional (2D) images of the target space during a plurality of acquisition cycles, each the acquisition cycle being timed to correspond with the projection of at least a sub sequence of the sequence, the sub sequence comprising red, green, and blue gray coded light patterns of the plurality of gray coded light patterns, extracting range data and color texture information of at lea one object in the target space from the plurality of 2D images, and forming a 3D color image of the range data and color texture information.

29 Claims, 6 Drawing Sheets
(5 of 6 Drawing Sheet(s) Filed in Color)

DEVICES AND METHODS OF GENERATING THREE DIMENSIONAL (3D) COLORED MODELS

RELATED APPLICATION

This application claims the benefit of priority under 35 USC 119(e) of U.S. Provisional Patent Application No. 61/239,448 filed Sep. 3, 2009, the contents of which are incorporated herein by reference in their entirety.

FIELD AND BACKGROUND OF THE INVENTION

The present invention, in some embodiments thereof, relates to imaging and, more particularly, but not exclusively, to devices and methods of generating three dimensional (3D) colored models.

Geometry acquisition and 3D imaging of objects, such as moving objects, is required in a wide variety of applications ranging from motion capture, such as marker-less motion capture, to 3D face recognition.

Various acquisition and reconstruction methods have been developed for this purpose. An example of a traditional acquisition technique is laser scanning, for example as described in F. Bernardini and H. E. Rushmeier, The 3d model acquisition pipeline. Comput. Graph. Forum, 2(21):149-172, 2002, which is incorporated herein by reference. This technique is currently implemented for modeling static scenes. Another technique, which allows faster acquisition, is described in U.S. Pat. No. 7,224,384, filed Sep. 8, 1999, that teaches an optical imaging system with a taking lens system that collects light from a scene being imaged with the optical imaging system, a 3D camera that comprises at least one photo surface that receives light from the taking lens system simultaneously from all points in the scene and provides data for generating a depth map of the scene responsive to the light, and an imaging camera with at least one photo surface that receives light from the taking lens system and provides a picture of the scene responsive to the light.

This method measures range data by calculating a depth profile of reflected photons resulting from an accurately gated and synchronized light pulse illuminating the scene. Time of light has low complexity reconstruction and can be implemented by a fast camera with linear response achieving video rates. The method involves compensating for the object albedo and other optical and manufacturing factors and therefore has a limited spatial resolution.

Another technique, which allows relatively fast acquisition, is a shape from stereo method that is based on multiple views. This method involves finding dense correspondences between two images of the same scene captured at two different viewing angles. Some of these methods use controlled source of illumination, which allows alleviating or completely resolving the correspondence problem. An example of the shape from stereo method is a structured light process where one or more known patterns, often grids or horizontal bars, is projected on a target space 99, a scene. The way that the one or more known patterns deform when striking surfaces in the target space 99 allows calculating the depth and surface information of the objects in the scene. An example for this technique is described in Patent Application NO. 2010/0079581 which describes imaging device capable of capturing depth information or surface profiles of objects is disclosed herein. The imaging device uses an enclosed flashing unit to project a projection sequence of structured light patterns onto an object and captures the light patterns reflected from the surfaces of the object by using an image sensor that is enclosed in the imaging device. The imaging device is capable of capturing an image of an object such that the captured image is comprised of one or more color components of a two-dimensional image of the object and a depth component that specifies the depth information of the object.

A recent review on coded light techniques can be found in C. Rocchini, P. Cignoni, C. Montani, P. Pingi, and R. Scopigno. A low cost 3D scanner based on structured light. In Eurographics 2001, volume 20, 2001 and a detailed description on pattern coding and reconstruction algorithms in A. M. Bronstein, M. M. Bronstein, E. Gordon, and R. Kimmel. High-resolution structured light range scanner with automatic Calibration, CIS-2003-06 technical report, Technion, 2006, both incorporated herein by reference.

Low-cost accurate depth acquisition based on coded light system is described in A M. B. Vieira, L. Velho, A. Sa, and P. Carvalho. A cameraprojector system for real-time 3D video. In DVPR '05, 2005, which is incorporated herein by reference. This document describes a scanning system which is based on coding part of the projected patterns in color. This approach requires a color camera and can be sensitive to the reflectance properties of the scanned objects.

SUMMARY OF THE INVENTION

According to some embodiments of the present invention there is provided a method of forming at least one three dimensional (3D) color image of at least one object in a target space. The method comprises a) projecting, each of a plurality of projection cycles, a sequence comprising a plurality of gray coded light patterns, each colored in one of red green or blue, on a target space, b) capturing a plurality of two dimensional (2D) images of the target space during a plurality of acquisition cycles, each the acquisition cycle being timed to correspond with the projection of at least a sub sequence of the sequence, the sub sequence comprising red, green, and blue gray coded light patterns of the plurality of gray coded light patterns, c) extracting range data and color texture information of at least one object in the target space from the plurality of 2D images, and d) forming a 3D color image of the range data and color texture information.

Optionally, the extracting comprises decoding at least one of the plurality of gray coded light patterns from the plurality of 2D images to extract the range data.

Optionally, the forming comprising extracting color texture information of the plurality of 2D images.

Optionally, the method further comprises iteratively repeating a)-d) and forming a sequence of 3D color images based on the repetition.

Optionally, the sub sequence comprising light patterns which are set such that each pixel of an image plane depicting the target space is illuminated with blue, green, and red light during each the acquisition cycle.

Optionally, further comprising calibrating the timing of the plurality of acquisition cycles according to the plurality of projection cycles.

More optionally, the calibrating comprising identifying a pattern order in the sequence and the calibrating the timing of the plurality of acquisition cycles according to the pattern order.

Optionally, the target space is a marker-less scene.

Optionally, the forming comprises combining the plurality of 2D images to form the 3D color image.

Optionally, the sequence comprising a first sub sequence of a plurality of colored light patterns and a second sub sequence of a plurality of respectively complementary colored light patterns.

Optionally, the sub sequence comprising colored light patterns which are summed to a multicolor strips light pattern.

Optionally, the sequence comprising high frequency light patterns and low frequency light patterns.

Optionally, the plurality of gray coded light patterns encode a plurality of stripe codes.

More optionally, the decoding comprising identifying and interpolating the plurality of stripe codes to extract the range data.

According to some embodiments of the present invention there is provided a system of forming a colored three dimensional (3D) image of at least one object in a target space. The system comprises a projector which sequentially projects a sequence comprising a plurality of gray coded light patterns, each colored in one of red green or blue, in a plurality of projection cycles, an image sensor which captures a plurality of two dimensional (2D) images of the target space during a plurality of acquisition cycles, a calibration module which times each the acquisition cycle to correspond with the projection of at least a sub sequence of the sequence, the sub sequence comprising red, green, and blue gray coded light patterns of the plurality of gray coded light patterns, and a computing unit which extracts range data and color texture information of at least one object in the target space from the plurality of 2D images and forms a 3D color image of the at least one object based on the color texture information and the range data.

Optionally, the computing unit decodes at least one of the plurality of gray coded light patterns from the plurality of 2D images to extract the range data.

Optionally, the projector is a DLP projector.

Optionally, the projector projects the plurality of gray coded light patterns in a first rate and the calibration module times each the acquisition cycle in a second rate.

Optionally, the system further comprises a pattern detection module which identifies a projection order of the plurality of gray coded light patterns, the calibration module times each the acquisition cycle according to the projection order.

According to some embodiments of the present invention there is provided a method of forming at least one three dimensional (3D) color image of at least one object in a target space. The method comprises a) projecting, each of a plurality of projection cycles, a sequence comprising a plurality of red, blue and green gray coded light patterns on a target space, b) capturing a plurality of two dimensional (2D) images of the target space during a plurality of acquisition cycles, each the acquisition cycle being timed to correspond with the projection of at least a sub sequence of the sequence, the sub sequence comprising at least one red gray coded light pattern, at least one blue gray coded light pattern, and at least one green gray coded light pattern of the plurality of gray coded light patterns, c) decoding at least one of the plurality of gray coded light patterns from the plurality of 2D images to extract range data of at least one object in the target space, and d) forming a 3D color image of the at least one object from the plurality of 2D images based on the range data.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a schematic illustration of a system of generating colored three dimensional (3D) frame(s) of object(s) in a target space, according to some embodiments of the present invention;

FIG. 2 is a flowchart of a method of generating a colored three dimensional (3D) frame(s) of a target space, such as a marker-less scene, according to some embodiments of the present invention;

FIG. 3 is a schematic illustration of a single exemplary projection cycle of 60 Hz with four 240 Hz RGB sub-cycle signals and synchronized 180 Hz sub-cycle signals, according to some embodiments of the present invention;

FIG. 4 is a schematic illustration of a single exemplary projection cycle and possible grabbing sequences, according to some embodiments of the present invention;

FIG. 5 is a schematic illustration of strips light patterns in a plurality of color components which are summed to a multicolor strips light pattern, according to some embodiments of the present invention;

FIG. 6 depicts three multi color patterns which may be created by projecting nine light patterns on the target space, according to some embodiments of the present invention;

FIG. 7A depicts a sequence of multicolor patterns formed during a projection cycle and allows forming two 3D frames, according to some embodiments of the present invention;

FIG. 7B depicts another sequence of multicolor patterns formed during a projection cycle and allows forming four 3D frames, according to some embodiments of the present invention;

FIG. 8 depicts a sequence of images of a human mouth uttering, captured according to some embodiments of the present invention;

FIG. 9 is a 3D facial recognition model captured according to some embodiments of the present invention; and FIG. 10 depicts a model of the curvature of breast for plastic surgery, captured according to some embodiments of the present invention.

DESCRIPTION OF EMBODIMENTS OF THE INVENTION

Figure 1:
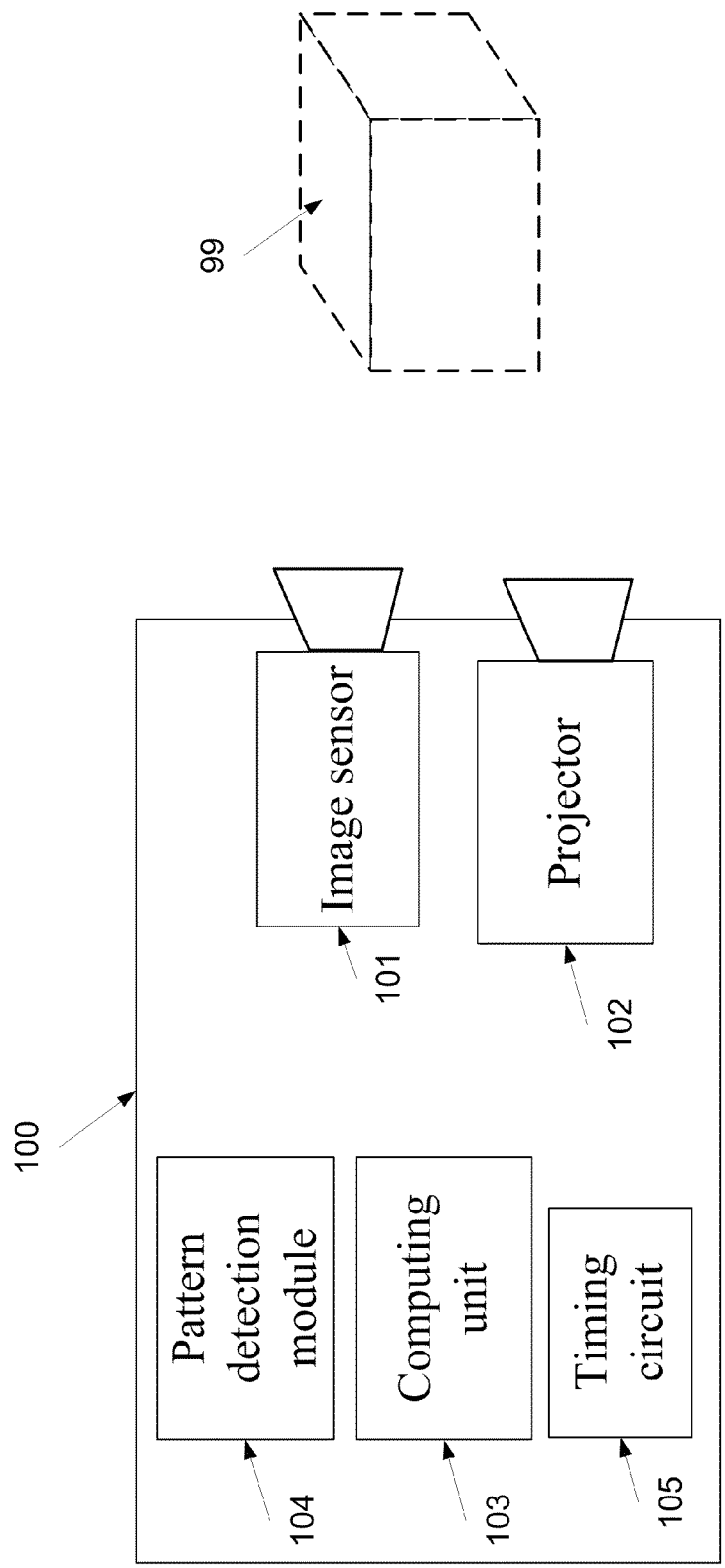

The present invention, in some embodiments thereof, relates to imaging and, more particularly, but not exclusively, to devices and methods of generating three dimensional (3D) colored models.

According to some embodiments of the present invention there are provided a method and a system of forming/reconstructing a 3D color image from color 2D images, which depict projected light patterns, based on range data that is decoded therefrom. The method and system are based on projecting the target space with colored light patterns. These light patterns are selected in a manner that allows decoding the projection plane, which may be referred to herein as range data, and color information at the pixel level from 2D images captured during the projection of the light patterns. In such embodiments, the same 2D images are used for reconstructing both color texture and range data. The system and method are optionally based on a calibration between projection and image acquisition cycles which insure correspondence between the projecting means and the acquisition means and therefore reduces the reconstruction efforts to triangulation methods.

According to some embodiments of the present invention there are provided a method of forming at least one 3D color image of object(s) in a target space. The method comprises projecting on a target space with a sequence comprising a plurality of red gray coded light patterns, a plurality of blue gray coded light patterns, and a plurality of green gray coded light patterns, in each of a plurality of projection cycles. The method further comprises capturing, in a calibration with the projection, a plurality of 2D images of the target space during a plurality of acquisition cycles. Each acquisition cycle is timed to correspond with the projection of at least a sub sequence of the sequence. The sub sequence includes one or more of the red gray coded light patterns, the blue gray coded light patterns, and the green gray coded light patterns. This allows decoding one or more gray coded light patterns from the 2D images to extract range data of object(s) in the target space and forming a 3D color image of the object(s) from the 2D images based on the range data.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is a schematic illustration of a system 100 of generating colored three dimensional (3D) color images, such as 3D images, 3D models and/or other 3D representations, of one or more rigid and/or non-rigid objects in a target space 99 by capturing and analyzing images of the target space 99, projected with light patterns, according to some embodiments of the present invention. The system 100 includes an image sensor 101, such as a camera, a charge coupled device (CCD) sensor and/or a complementary metal oxide semiconductor (CMOS) based sensor for capturing light from the target space 99 at a rate of above 60 frames per second (fps). For example, the image sensor 101 may be a monochrome PointGrey Dragonfly Express camera which the specification thereof is described in Dragonfly Technical Reference Manual, 2004, FlyCapture API Programming Reference, October 2006, and PGR IEEE-1394 Digital Camera Register Reference, September 2006. Version 2.0, which are incorporated herein by reference. When this camera is used, the frame rate is set above 120 fps and using an external synchronization signal, it transmits only 70% of the image without compromising for the other parameters.

The system 100 further includes a projector 102 that is set to project sequentially sequences of gray coded light patterns, such as red, green, and blue light patterns, for example as described below and depicted in FIG. 5. Optionally, the projector 102 and/or the image sensor 101 are mounted on a supporting arrangement (not shown). The distance between the image sensor 101 and the projector is known for triangulation calculations, for example as described below. Optionally, the projector 102 is a digital light processing (DLP) projector, for example a Toshiba DLP LED based projector with a native resolution of 800×600. Optionally, the refresh rate of the projector 102 is about 60 Hertz (Hz), where each projection cycle is composed of four 240 Hz RGB sub-cycles.

The system 100 further comprises a computing unit 103 for executing image reconstruction process of one or more hardware/software modules, optionally with one or more microprocessors or any central processing unit (CPU). Optionally, the computing unit 103 controls the light patterns, which are set to be projected by the projector 102, and optionally the length of each projection cycle. Optionally, the computing unit 103 controls the length of the image grabbing timing and/or period, optionally referred to herein as acquisition Optionally, the computing unit 103 executes reconstruction processes of 2D images and 3D color images, for example as described below and/or the display of the 3D color images. Optionally, the computing unit 102 is set to produce a continuous real-time 3D color video stream, for example as further described below. Optionally, the computing unit 103 is an Intel PC with four dual-core 2.40 GHz CPUs, 2.5 GB RAM and an NVIDIA GeForce 9800 GX2 GPU with 0.5 GB memory. Optionally, the computing unit 103, the projector 102, and the image sensor 101 are enclosed in a rigid housing 104. Optionally, the width and length of the housing 104 is about 15 centimeters. Optionally, the computing unit 103 is a client terminal, such as a laptop, a personal computer, a smartphone, and/or a tablet and the computing unit 103 and/or the projector 102 are integrated components and/or connected thereto via respective interfaces. Optionally, the computing unit 103 includes a graphic processor unit (GPU) for reconstructing color texture information from the 2D color images, for example as described below. For example, a GPU-NVIDIA GeForce 9800 GX2. 512 MB is used. For example, color information or color texture information means a color distribution in a reconstructed 3D space, optionally in a predetermined color space.

Figure 2:
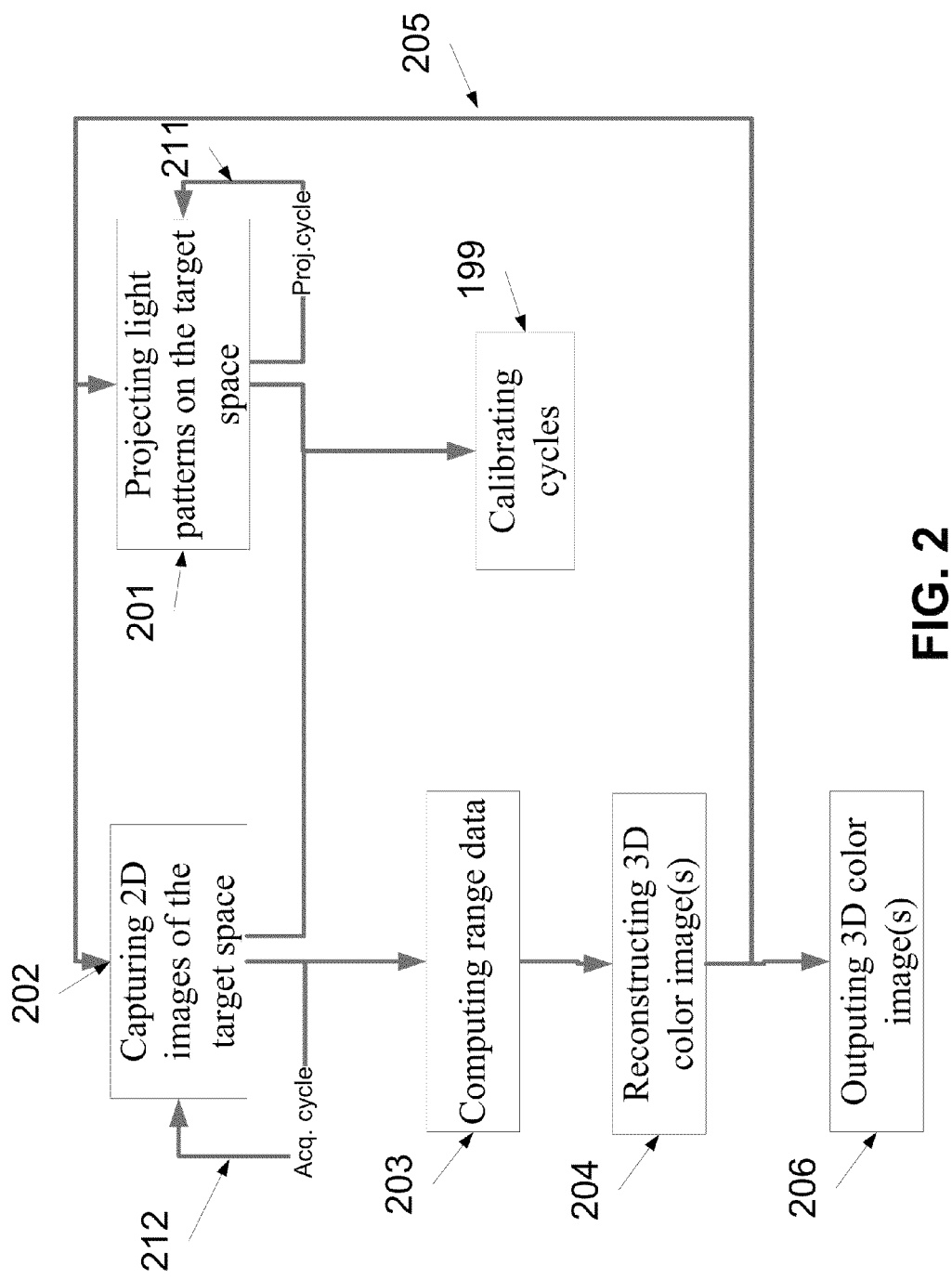

Reference is now also made to FIG. 2, which is a flowchart 200 a method of generating a colored three 3D frame(s) of one or more objects in a target space, such as 99, for example in a marker-less scene, optionally using the device 100, according to some embodiments of the present invention.

First, as shown at 201, the projector 102 projects light patterns on the target space 99 in a plurality of projection cycles. During each projection cycle, the projector 102 projects a sequence of a plurality of gray coded light patterns. As used herein, a gray coded light pattern means a projection of an image having a binary pattern, for example shaped colored light that is patterned according to a certain outline, such as an outline of strips, dots, squares, cross hatching and the like. The shaped colored light may be, for example red, blue or green.

Figure 3:
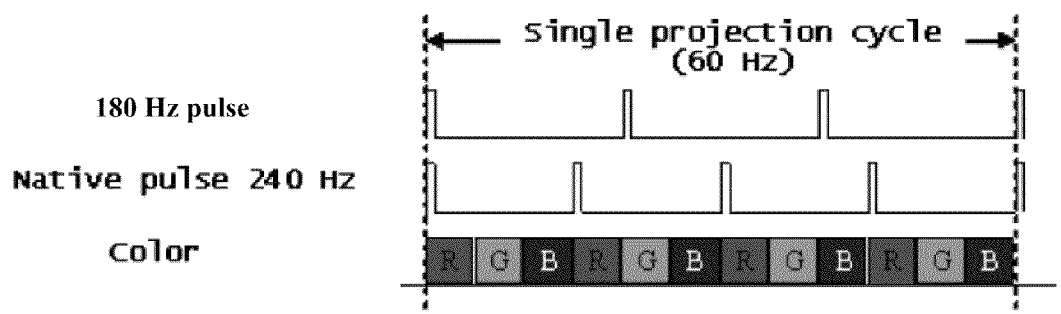

Each projection sequence includes one or more of red colored, blue colored, and green colored light pattern projections. For example, the projector 102 is a DLP projector having a refresh rate of about 60 Hz, where each projection cycle is composed of four 240 Hz red-blue-green (RGB) sub-cycles wherein in each sequential sub-cycle, another gray coded light pattern is projected. FIG. 3 depicts a single exemplary projection cycle of 60 Hz with four 240 Hz RGB sub-cycle signals and synchronized 180 Hz sub-cycle signals, according to some embodiments of the present invention. In this example, the target space 99 is projected four times and synchronized with the 3 camera grabbing periods of between one and two milliseconds, for example about 1.3 msec, each time by a single color component. These projection cycles are sequentially repeated, as shown at 211.

The projection of the light patterns on the target space 99, in such projection cycles, allows the image sensor 101 to capture, as shown at 202, a plurality of two dimensional (2D) images of the target space 99, illuminated by multicolor patterns, in a plurality of acquisition cycles, as shown at 212. In such a manner, the light reflected from the target space 99, when it is projected with a plurality of different colored light patterns, is grabbed by the image sensor during a single acquisition cycle to form a 2D image. This allows grabbing different color components of light reflected from the target space 99, referred to as color planes, and interleaving them.

Optionally, as shown at 199, the projection and acquisition cycles may be timed or otherwise calibrated. Optionally, the calibration is performed such that light projected during a number of colored light pattern projections are captured. For example, the acquisition process of the image sensor may be timed such that each projection cycle is calibrated with one or more acquisition cycles. For example, a timing circuit 105 or a module that divides the projector's inner clock signal, such as the aforementioned 240 Hz clock signal, into a synchronized signal, for example 180 Hz signal, is used. This circuit 105 or module triggers the image sensor 101 so as to grab distinct color planes of the projected target space 99 at constant time intervals, for example three acquisition cycles per one projection cycle. In one example, a DLP projector with 240 Hz RGB sub-cycles is used and a circuit 105 that divides the projector's inner 240 Hz clock signal into a synchronized 180 Hz signal is used to time the image sensor 101. In this example, the acquisition cycle of the image sensor 101 is a 180 Hz cycle and the projection cycle is a 240 Hz cycle, as shown at FIG. 3.

Such a circuit, as shown at 105, allows synchronizing standard image sensor, such as a monochromatic camera and standard projector, such as off-the-shelf LED projector, for forming 3D color images as elaborated herein. Such components allow, for example, capturing images at a rate of 200 fps and allow for real-time reconstruction of both depth and color at video rates. The reconstruction and display may be performed at around 30 depth profiles and color texture per second.

Figure 4:
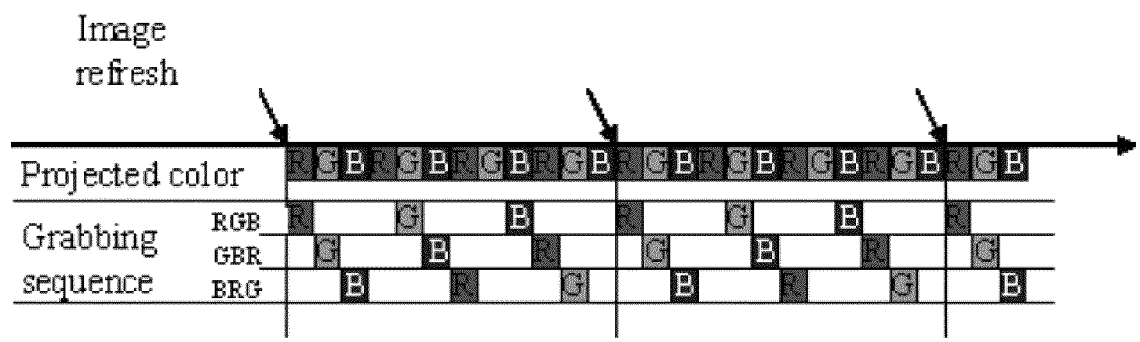

Optionally, the calibration includes a color synchronization process where the order of the captured color planes is identified and/or synchronized. Such color synchronization is needed as at startup, the initial location of the acquisition cycle within the projection cycle, where a sequence of light patterns is projected, is unknown and therefore the order of capturing the color planes in each acquisition cycle is also unknown. When the length of the acquisition cycle is third of an RGB projection cycle, the captured light patterns may be in any of the following orders: RGB, GBR and BRG, as shown in FIG. 4. Optionally, the system 100 includes a pattern detection module 104 which identifies the phase shift according to the outputs of the image sensor 101 in a synchronization mode and synchronizes the cycles at a known color planes (RGB) order. It should be noted that acquiring the color planes in a known order is necessary for matching the acquired image to a corresponding colored light pattern so as to allow proper reconstruction of the projected code. Optionally, the pattern detector module 104 uses a phase locking synchronization loop, in which the local monotonicity of the stripe code is selected from possible reconstruction combinations. Optionally, for calculating the local monotonicity of the stripe code, each pixel in the stripe code is calculated and values in a few adjacent vertical pixels are checked and the overall test value is increased. The more pixels that have local monotony in the stripe code, the higher the test result value Optionally, the values in adjacent vertical pixels is done if at least four pixels stripe codes are monotonously increasing.

According to some embodiments of the present invention, a projection sequence includes a sub sequence of a plurality of gray coded light pattern projections of RGB color components and another sub sequence of a plurality of complementary gray coded light pattern projections, which may be referred to as corresponding negative pattern projections. In such a manner, in each projection cycle, each pixel on the image plane of the target space 99 is illuminated with red, green, and blue light.

Figure 5:
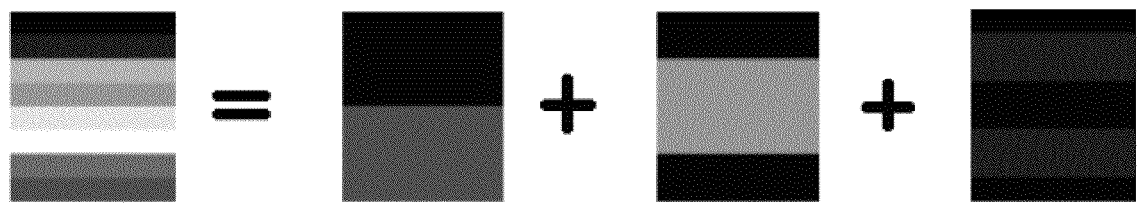

Optionally, a projection sequence includes sub sequences of strips light patterns in a plurality of color components which are summed to a multicolor strips light pattern, for example as shown at FIG. 5. In one example, a projection sequence includes 18 different gray coded light patterns. For example, the 18 patterns includes 2n different strip patterns, each of the first n patterns has l" strips where n=1, . . . , 8 and each of the second n patterns includes a respective complementary gray coded light pattern projection.

Figure 6:
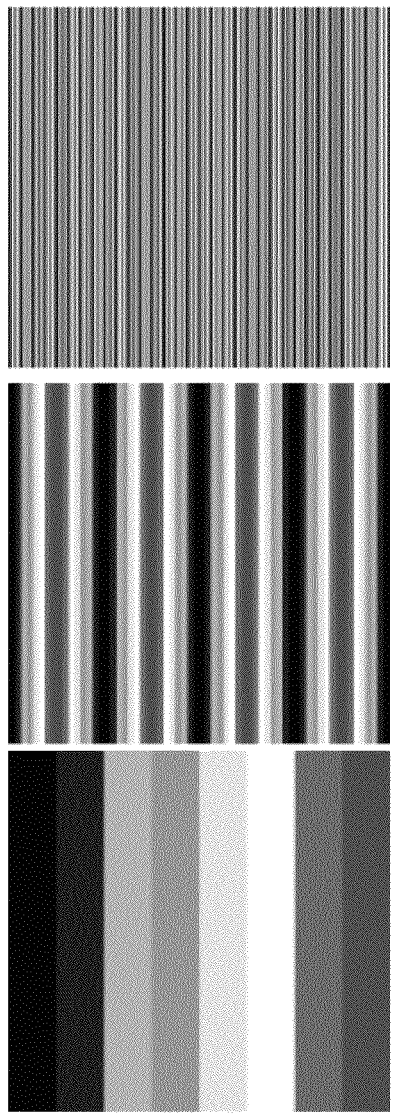

The projected light patterns may be divided to a number of sets, which are separately acquired to form a 2D image. The 2D images are combined, as described below, to form a 3D color image. FIG. 6 depicts three multi color patterns which may be created by projecting nine light patterns on the target space 99. Each of these multi color patterns may illuminate the target space during different acquisition cycles.

Figure 7A:
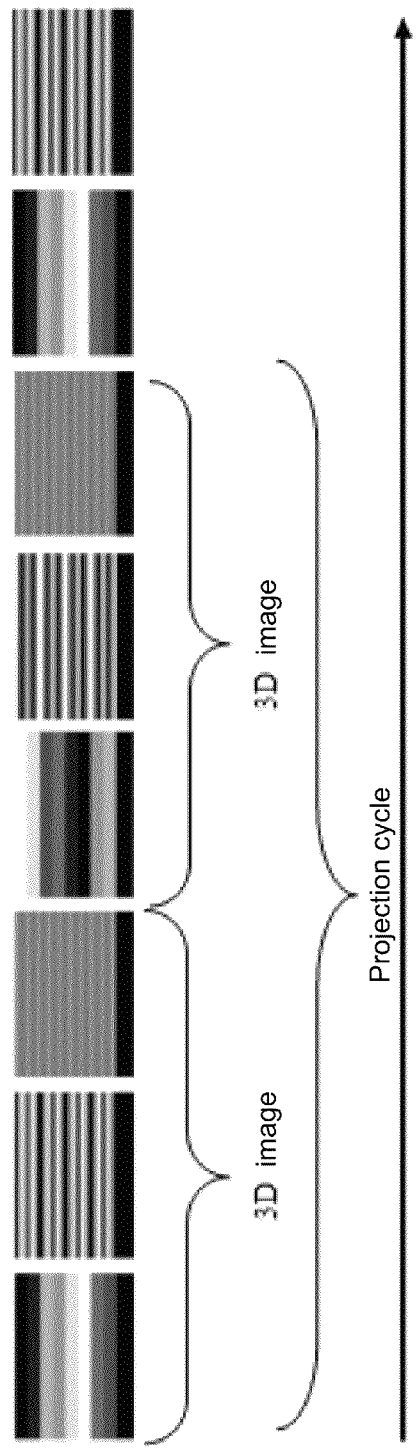

Each 2D image is generated by acquiring an image during the projection of 3 different light patterns, for example respectively 1, 2, and 4 stripes patterns, 8, 16, and 32 stripes patterns, and 64, 128, and 257 stripes patterns in different colors. Optionally, the projection of these 9 light patterns may be at 20 depth fps to allow acquiring data for a reconstruction of 3D color images, optionally of stationary objects, at a spatial resolution of 0.1 mm. Optionally, these nine light patterns are a sub sequence of a sequence of 18 patterns that includes their respective complementary gray coded light pattern projections. This sequence allows the reconstruction of two 3D images, each reconstructed from combining three images where each image is a combination of three light patterns, as shown at FIG. 7A.

Figure 7B:
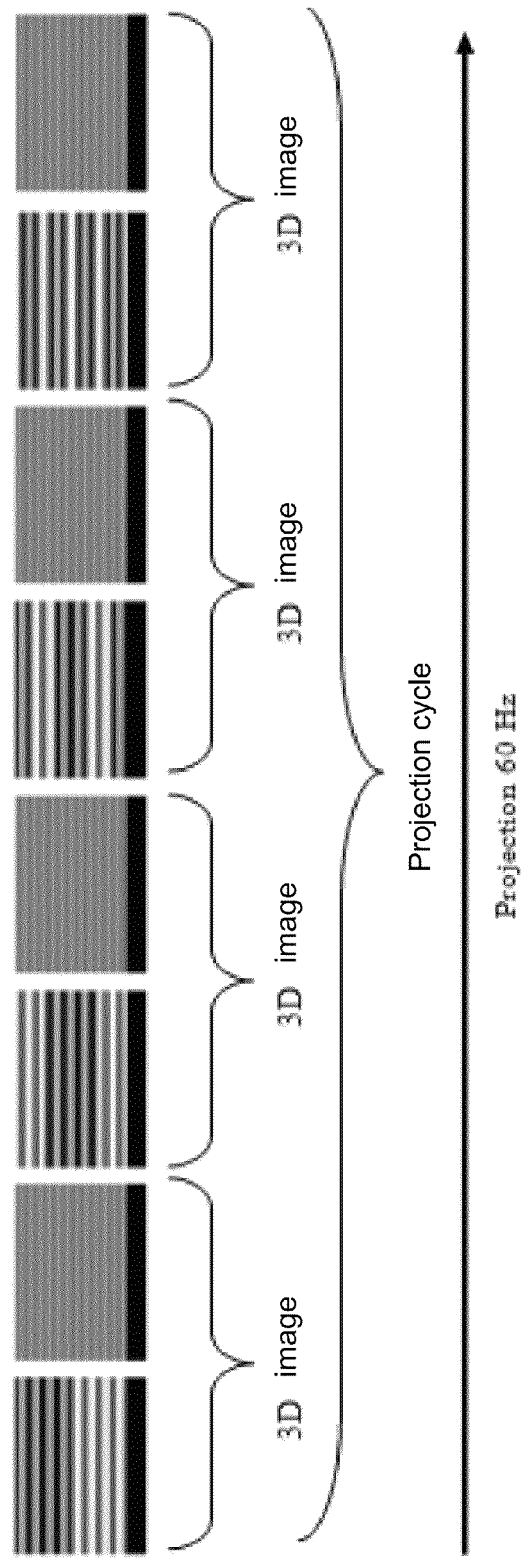

In order to further accelerate the frame rate, it is possible to reduce the number of projected light patterns which are acquired for forming each 3D color image while preserving the reconstruction accuracy. For example, the frame rate may be set to 30 depth fps using the same hardware as described above, achieving similar reconstruction accuracy. Optionally, the projection cycle includes projecting a sequence of 24 light patterns from which four 3D color images are formed. Each 3D color images is generated from data acquired in two acquisition cycles, for example as shown at FIG. 7B. Optionally, the 24 light patterns are composed of five high frequency patterns (least significant Gray code bits), for example at 180 Hz, and four low frequency patterns (most significant Gray code bits), for example at 60 Hz. Each low frequency pattern appears once every 24 patterns and each high frequency pattern appears once every six patterns. As before, each acquired image is a composition of three distinct light patterns. This way, the number of projections of light patterns per a 3D color image is reduced, thus enabling an accurate 3D reconstruction by combining two images in two acquisition cycles.

Now, as shown at 203, range data regarding the one or more objects in the target space 99 is extracted per 3D color image by analyzing the projection plane at respective acquired 2D images. The range data is extracted by decoding the gray code from the pattern in the images. Optionally, the range data is performed by triangulations which may be performed by a reconstruction module, such as one or more HLSH DirectX shader modules that executes a reconstruction function. Optionally, for each pixel in the set of 2D images, the stripe code is extracted. The reconstruction module computes, per-pixel, maximum and the minimum values of patterns of the same color. The values are used as local binarization thresholds. This binarization yields the bits of the Gray code at every pixel. Next, the coordinates of the image sensor and the projector, which are known in advance, are passed to the reconstruction module, which performs triangulation using respective image sensor and projector matrices, pre-computed at the calibration stage, for example as described in A. M. Bronstein, M. M. Bronstein, E. Gordon, and R. Kimmel. High-resolution structured light range scanner with automatic calibration. CIS-2003-06 technical report, Technion, 2006, which is incorporated herein by reference. The reconstruction module outputs the range data, for example as spatial coordinates of each pixel in the image plane which depict the target space 99. Optionally, when a shader is used as described above, the decoding and the reconstruction is based on 289 instructions, 5 of which are memory I/O and the remaining 284 are arithmetic operations. Sub-pixel resolution may be achieved by interpolating between the coded stripes. When used, such processing may be split into two shaders due to instruction count limitations. Due to noise and imperfections of frames captured by the image sensor along the stripe-code boundaries, filtering the 3D reconstructed profile may be performed. Among different robust filters, the best results are achieved using an efficient 2D median filter and/or a Beltrami filter that takes into consideration the gradient of the reconstructed profile, see L. Dascal, G. Rosman, and R. Kimmel. Efficient beltrami filtering of color images via vector extrapolation, In Proceedings of the 1st International conference on Scale Space and Variational Methods in Computer Vision (SSVM 07), volume 4485, pages 92-103. Lecture Notes in Computer Science, Springer Verlag, 2007 and N. Sochen, R. Kimmel, and R. Malladi, A general framework for low level vision, IEEE Transactions on Image Processing, 7(3):310-318, 1988, which are incorporated herein by reference.

Now, as shown at 204, one or more 3D color images are formed by combining a set of 2D images, captured as described above, and the range data. The forming optionally includes reconstructing color texture information of the one or more objects in the target space. Optionally, the color texture information is calculated by a graphic processor unit (GPU) which calculates the pixels in of the 3D color images from respective pixels in the set of 2D images.

As shown at 205, blocks 201-204 may be iteratively performed to allow the production of a sequence of 3D color images. As shown at 206, the one or more 3D color images are outputted, for example to a display and/or of an image processing module.

Optionally, the orientation of the projector 102 and the image sensor 103 is calibrated. The orientation calibration may be performed as described in F. Devernay and O. Faugeras, Straight lines have to be straight: Automatic calibration and removal of distortion from scenes of structured environments, Machine Vision and Applications, 13(1):14-24, 2001; R. Y. Tsai. A versatile camera calibration technique for high accuracy 3d machine vision metrology using off-the-shelf tv cameras lenses, IEEE Journal of Robotics and Automation, RA-3(4):323-344, 1987; and Z. Zhang, A flexible new technique for camera calibration. MSR-TR-98-71 technical report, Microsoft Research, 2002, which are incorporated herein by reference. For example, the two camera calibration, which is described in Z. Zhang, A flexible new technique for camera calibration. MSR-TR-98-71 technical report, Microsoft Research, is used, with an adjustment as described in M. B. Vieira, L. Velho, A. Sa, and P. Carvalho, A camera projector system for real-time 3D video, DVPR 2005, which is incorporated herein by reference. In this adjustment, the projector 102 is modeled as a second inverted imager sensor, for example as described in S. Zhang and P. S. Huang, A novel method for structured light system calibration, Optical Engineering, 45(8), 2006, which is incorporated herein by reference. In this embodiment, 10-14 images of a checkerboard at different locations and orientations are captured. 5-7 of these images are used for the calibration, while the projector is considered as an inverse image, and the rest for verification. A pinhole camera model is assumed as well as standard calibration parameterization, for example as described in R. Hartley and A. Zisserman, Multiple View Geometry in Computer Vision, Cambridge University Press, New York, N.Y., USA, 2003, which is incorporated herein by reference. Optical distortion is estimated and corrected at the initialization phase. Using the checkerboard images, the distortion parameters may be accurately estimated, as part of the calibration parameters. While taking into account the radial distortion, tangential distortion parameters are be negligible, see F. Devernay and O. Faugeras, Straight lines have to be straight: Automatic calibration and removal of distortion from scenes of structured environments, Machine Vision and Applications, 13(1):14-24, 2001 and R. Hartley and A. Zisserman, Multiple View Geometry in Computer Vision, Cambridge University Press, New York, N.Y., USA, 2003, which are incorporated herein by reference. The calibration is optionally based on the assumption that straight lines are invariant under projective transformations and that corners may be accurately detected on checkerboard images, and projections of the same 20-50 lines, with accurately detected corners of several planes, provide an approximation of a small number of distortion parameters. After corner detection, the corrected corners are used to find external parameters like rotation, translation, and other internal parameters. The test images of the checkerboard are used to validate the accuracy of the estimated projection matrices. In such embodiments, a root mean squared (RMS) error of approximately 0.25 mm is achieved for objects at a distance of about 70 cm from the image sensor 103. Projection errors are typically about 0.15 image sensor pixels and 0.3 projector pixels.

Figure 8:
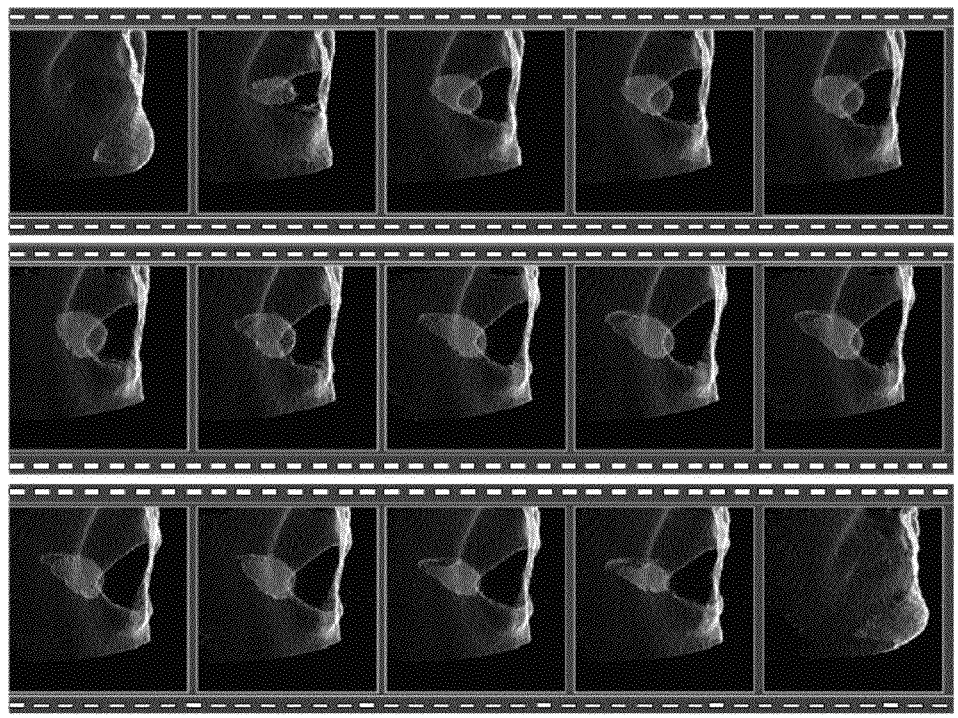
Figure 9:
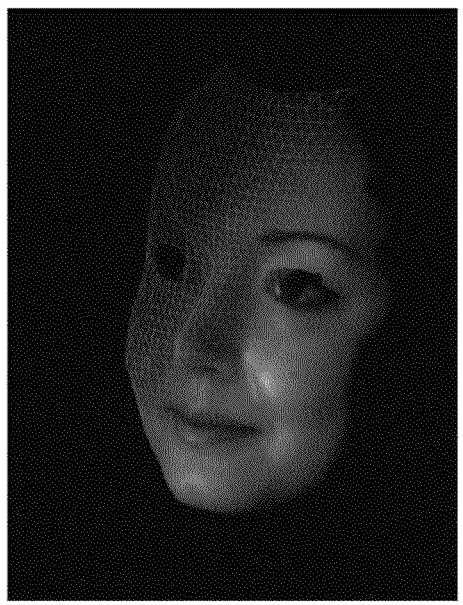

Optionally, the method depicted in FIG. 2 and the apparatus depicted in FIG. 1 may be used for capturing a sequence of 3D color image which represent a motion or a change of one or more objects in the target space 99. For example, FIG. 8 depicts a sequence of images of a human mouth uttering the sound "ha" and acquired at a rate that allows forming 20 depth frames per second. The high resolution of the frames, which are formed in a high reconstruction rate, allows forming facial features and lips and tongue movements in an accuracy that allows robust real time lip reading applications. As used herein, real time means during a short time interval surrounding a captured event, such a change in facial features and/or lips and/or tongue movements. This also allows capturing face features of moving subject for a 3D facial recognition system, for example as shown at FIG. 9.

Figure 10:

Optionally, the method depicted in FIG. 2 and the apparatus depicted in FIG. 1 may be used for forming a 3D model of an object, such as an organ, a gemstone and/or a raw material before the operation and/or processing thereof. For example, organs may be imaged for preoperative operations and a gemstone may be imaged for evaluation. FIG. 10 depicts a scanning of the curvature of breast for plastic surgery. Optionally, a 3D color image which is based on scans of non-cooperative newborn infants may be used for diagnosis of chromosomal disorders that have specific facial phenotypic expression.

It is expected that during the life of a patent maturing from this application many relevant devices and methods will be developed and the scope of the term an image sensor, a projector, a computing unit, a module is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of forming at least one three dimensional (3D) color image of at least one object in a target space, comprising:
   a) projecting, in each of a plurality of projection cycles, a sequence comprising three gray coded shaped light patterns, one pattern colored in only red, one pattern colored in only green, and one pattern colored in only blue, on a target space, said patterns projected one at a time, each of said light patterns including a plurality of portions having a geometric shape;
   b) capturing a plurality of two dimensional (2D) images of said target space during a plurality of acquisition cycles, each said acquisition cycle being timed to correspond with the projection of at least a sequence, comprising said red, green, and blue gray coded light patterns;
   c) extracting range data and color texture information of at least one object in said target space from said plurality of 2D images; and
   d) forming a 3D color image of the at least one object based on said range data and color texture information.

2. The method of claim 1, wherein said extracting comprises decoding at least one of said plurality of gray coded light patterns from said plurality of 2D images to extract said range data.

3. The method of claim 1, wherein said forming comprising extracting color texture information of said plurality of 2D images.

4. The method of claim 1, further comprising iteratively repeating a)-d) and forming a sequence of 3D color images based on said repetition.

5. The method of claim 1, wherein said sub sequence comprising light patterns which are set such that each pixel of an image plane depicting said target space is illuminated with blue, green, and red light during each said acquisition cycle.

6. The method of claim 1, wherein further comprising calibrating the timing of said plurality of acquisition cycles according to said plurality of projection cycles.

7. The method of claim 6, wherein said calibrating comprising identifying a pattern order in said sequence and said calibrating the timing of said plurality of acquisition cycles according to said pattern order.

8. The method of claim 1, wherein said target space is a marker-less scene.

9. The method of claim 1, wherein said forming comprises combining said plurality of 2D images to form said 3D color image.

10. The method of claim 1, wherein said sequence comprising a first sub sequence of a plurality of colored light patterns and a second sub sequence of a plurality of respectively complementary colored light patterns.

11. The method of claim 1, wherein said sub sequence comprising colored light patterns which are summed to a multicolor strips light pattern.

12. The method of claim 1, wherein said sequence comprising high frequency light patterns and low frequency light patterns.

13. The method of claim 1, wherein said plurality of gray coded light patterns encode a plurality of stripe codes.

14. The method of claim 13, wherein said decoding comprising identifying and interpolating said plurality of stripe codes to extract said range data.

15. A system of forming a colored three dimensional (3D) image of at least one object in a target space, comprising:
   a projector to sequentially project a sequence comprising a plurality of gray coded shaped light patterns, each pattern colored in only one of red, green or blue, in a plurality of projection cycles each pattern projected one at a time, each of said light patterns including a plurality of portions having a geometric shape;
   an image sensor to capture a plurality of two dimensional (2D) images of said target space during a plurality of acquisition cycles;
   a calibration module to time each said acquisition cycle to correspond with the projection of said sequence comprising red, green, and blue gray coded light patterns; and
   a processor to extract range data and color texture information of at least one object in said target space from said plurality of 2D images and to form a 3D color image of said at least one object based on said color texture information and said range data.

16. The system of claim 15, wherein said computing unit decodes at least one of said plurality of gray coded light patterns from said plurality of 2D images to extract said range data.

17. The system of claim 15, wherein said projector is a DLP projector.

18. The system of claim 15, wherein said projector projects said plurality of gray coded light patterns in a first rate and said calibration module times each said acquisition cycle in a second rate.

19. The system of claim 15, further comprising a pattern detection module which identifies a projection order of said plurality of gray coded light patterns, said calibration module times each said acquisition cycle according to said projection order.

20. At least one non-transitory computer readable medium storing instructions executed by a processor to perform a method comprising:
   a) projecting, in each of a plurality of projection cycles, a sequence comprising three gray coded shaped light patterns, one pattern colored in only red, one pattern colored in only green, and one pattern colored in only blue, on a target space, said patterns projected one at a time, each of said light patterns including a plurality of portions having a geometric shape;
   b) capturing a plurality of two dimensional (2D) images of said target space during a plurality of acquisition cycles, each said acquisition cycle being timed to correspond with the projection of at least a sequence, comprising said red, green, and blue gray coded light patterns;
   c) extracting range data and color texture information of at least one object in said target space from said plurality of 2D images; and
   d) forming a 3D color image of the at least one object based on said range data and color texture information.

21. The medium of claim 20, wherein said extracting comprises decoding at least one of said plurality of gray coded light patterns from said plurality of 2D images to extract said range data.

22. The medium of claim 20, wherein said forming comprising extracting color texture information of said plurality of 2D images.

23. The medium of claim 20, further comprising iteratively repeating a)-d) and forming a sequence of 3D color images based on said repetition.

24. The medium of claim 20, wherein said sequence comprising light patterns which are set such that each pixel of an image plane depicting said target space is illuminated with blue, green, and red light during each said acquisition cycle.

25. The medium of claim 20, wherein said method further comprising calibrating the timing of said plurality of acquisition cycles according to said plurality of projection cycles.

26. The medium of claim 25, wherein said calibrating comprising identifying a pattern order in said sequence and said calibrating the timing of said plurality of acquisition cycles according to said pattern order.

27. The medium of claim 20, wherein said target space is a marker-less scene.

28. The medium of claim 20, wherein said forming comprises combining said plurality of 2D images to form said 3D color image.

29. The medium of claim 20, wherein said sequence comprising a first sub sequence of a plurality of colored light patterns and a second sub sequence of a plurality of respectively complementary colored light patterns.

* * * * *